Jan. 25, 1949.

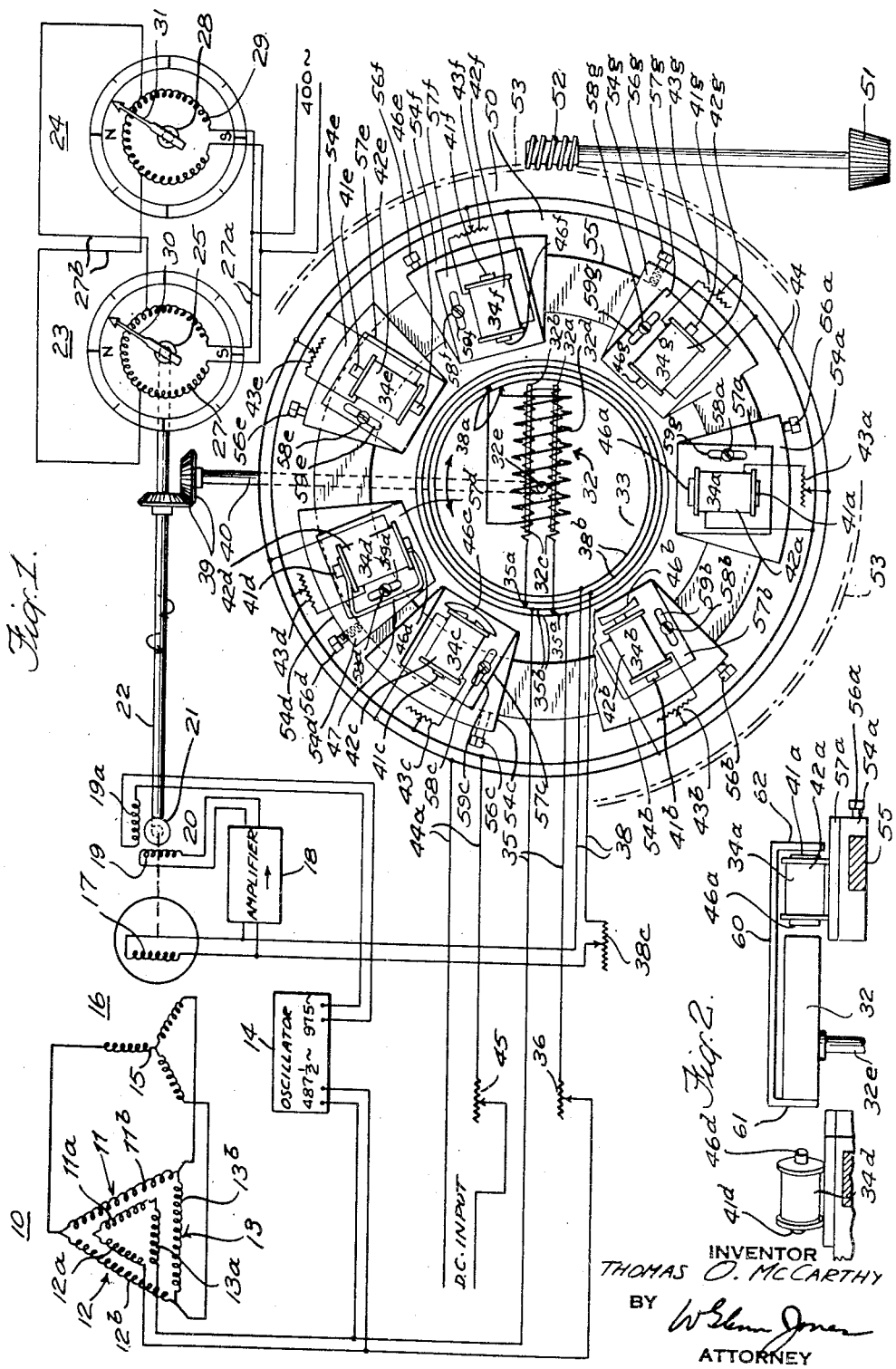

T. O. McCARTHY 2,459,830

MOTION REPEATING SYSTEM

Filed Sept. 12, 1944

INVENTOR
THOMAS O. McCARTHY.
BY W Glenn Jones
ATTORNEY

Patented Jan. 25, 1949

2,459,830

UNITED STATES PATENT OFFICE 2,459,830

MOTION REPEATING SYSTEM

Thomas O. McCarthy, United States Navy

Application September 12, 1944, Serial No. 553,777

21 Claims. (Cl. 318—30)

(Granted under the act of March 3, 1883, as amended April 30, 1928; 370 O. G. 757)

This invention relates to electrical systems for transmitting angular motion wherein the voltage distribution in a polycircuit field winding is utilized to control the angular position of a directional member of a repeater. Such a system may include an earth inductor compass having a saturable-core transformer or flux gate, or a Selsyn having a rotor driven by a compass, ordnance sighting device, radio direction finder or other element the angular movement of which is to be repeated. The repeater unit in such a system normally follows the transmitted data accurately.

In certain applications of angular-motion-transmission systems it is desired not to have the repeater follow the transmitter degree for degree. For example, in a remote-reading compass system it is desirable to introduce a correction for the well-known compass errors. Likewise in direction-transmitting systems such as used in ordnance for target designation, the transmitted direction must be modified to allow for horizontal and for vertical parallax before the gun, range finder, or searchlight will point at the target being designated by the locator instrument. Similarly, in radio direction finders there exists an error that resembles the deviation error in the compass art. This error must be corrected, compensated for, or removed so as to provide a true direction indication. There are many other installations incorporating direction-transmission systems where it is likewise desirable to provide a controllable asynchronous relation between the transmitter and repeater units.

In certain instances, the deviation or error that is to be corrected, when plotted as a function of the angular position of the directional element, may take the form of a sine curve which may be compensated by the introduction of a correction voltage of sine form. In other instances, however, the deviation may take the form of an irregular curve which cannot be compensated with sufficient accuracy by the introduction of a sinusoidal compensating voltage. It is accordingly an object of the present invention to provide, in a system of the above type, a source of compensating voltage that can be arbitrarily adjusted to follow a predetermined irregular curve as required for effective accurate compensation at all angular positions of the directional element.

Another object is to provide novel and improved means for introducing the correction voltage into a compass system.

Various other objects and advantages will be apparent as the nature of the invention is more fully disclosed.

In one embodiment of the invention I generate the compensating voltage by means of a wave generator in the form of a flux-gate element that rotates in a controllable magnetic field and is driven with the directional element. The controllable field may comprise a plurality of magnets which are variably spaced around the path of the rotating generator element and are individually adjustable so that the voltage generated by the flux-gate element at any particular angular position can be controlled independently of the voltage generated at other positions. In this way arbitrary irregular voltage curves can be produced.

The invention is particularly applicable to an earth-inductor-compass system including a flux gate having directional windings which are connected to supply driving voltage to a torque amplifier of any standard type, such as an Autosyn, which includes a polyphase stator connected to corresponding points of the earth inductor flux gate and a single-phase rotor which is driven by a separately energized motor to take up a position corresponding to the current distribution in its polyphase field. The motor drives a directional element of an angle-transmitting device which is connected to actuate a repeater in a manner well-known in the art.

In such a system the compensating flux-gate element is connected to be driven by the torque-amplifier motor so as to take up a position corresponding to the position of the directional element in the transmitter and the magnetic field elements are adjusted so as to introduce the desired compensation at each angular position of the compensating flux-gate element.

Although the novel features that are believed to be characteristic of this invention are pointed out more particularly in the claims appended hereto, the invention will be better understood by referring to the following description, taken in connection with the accompanying drawings, in which specific embodiments thereof have been set forth for purposes of illustration.

In the drawings,

Fig. 1 is a schematic diagram of a flux-gate earth-inductor-compass system embodying the present invention;

Fig. 2 is a detail view of a modified correction flux gate; and

Figure 3:
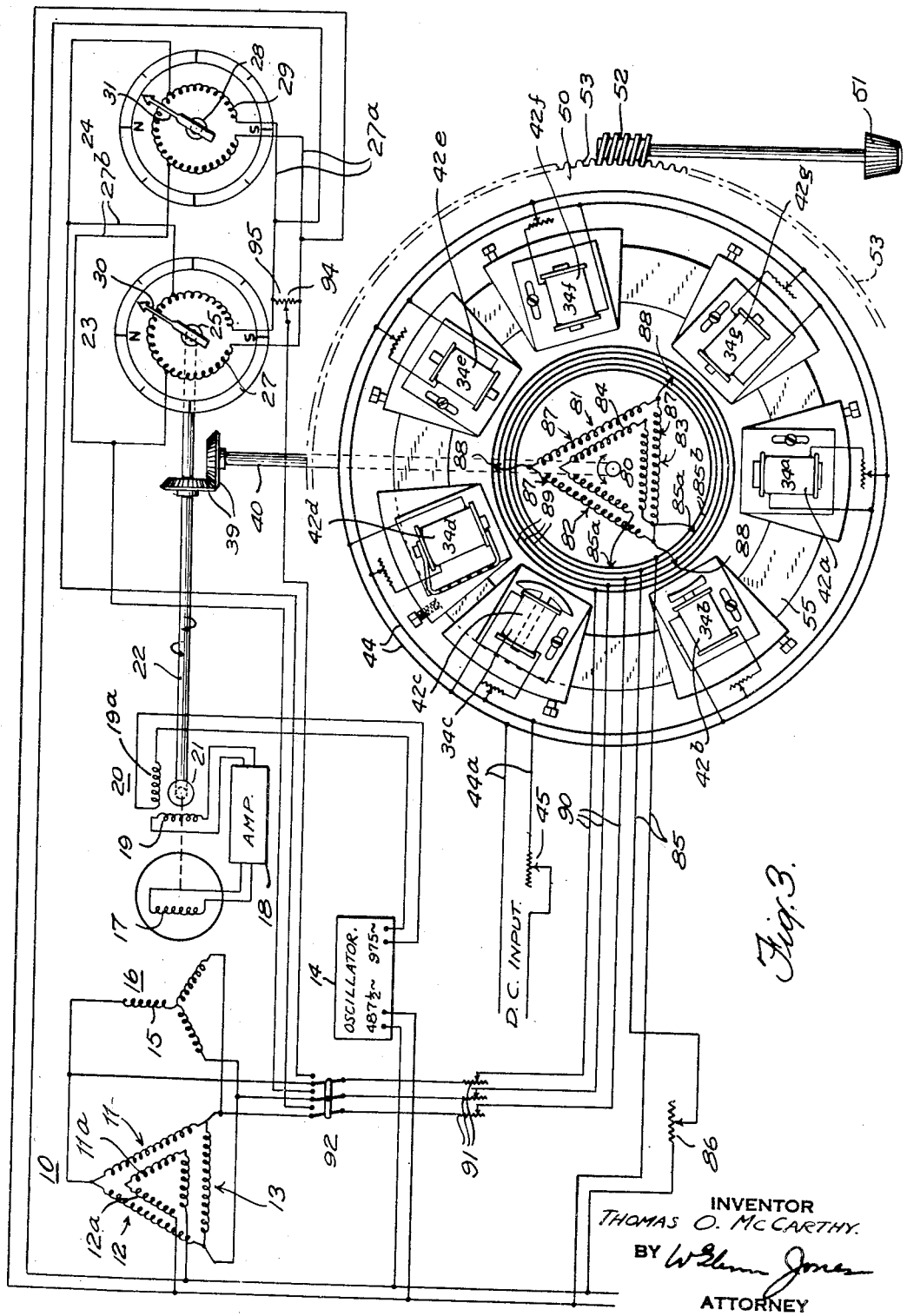
Fig. 3 is a schematic diagram similar to Fig. 1 illustrating a further embodiment of the invention.

Specific terms are used herein for convenience in referring to various details of the invention; these terms are to be given an interpretation commensurate with the state of the art.

As shown in Fig. 1, a saturable-core transformer, or flux gate, indicated by numeral 10, consists of three legs, 11, 12 and 13, arranged to form an electrical equi-lateral triangle. These legs are of the same construction and consist of pairs of closely adjacent cores carrying primary windings 11a—13a and secondary windings 11b—13b respectively. The construction and operation of one type of flux gate is set forth in the U. S. Patent 2,361,433 dated October 31, 1944.

In accordance with standard practice, the primary windings are each divided, one half being wound on each core. The two halves of each primary are wound in opposite directions to be non-inductive. The primary windings are excited from a source of alternating current, which in the present embodiment, has a frequency of 487½ cycles, obtained from a suitable oscillator 14 of conventional design and therefore shown only in block diagram.

The primary windings are designed to saturate their respective cores twice during each cycle, and for most of the cycle. During the saturation period there is, of course, no transformer action between the primaries and their associated secondaries. During each of the two unsaturated periods of the cycle, there is still no transformer action between the primary and secondary windings insofar as concerns the component of current in the primary from the 487½ cycle source, since the two halves of each primary winding are wound in opposite directions. However, during each of the unsaturated periods, the flux of the earth cuts through both halves of the core in the same direction and therefore induces a voltage in each secondary winding having a frequency of twice that of the primary, or 975 cycles.

In accordance with standard practice, the three legs of flux gate 10 may be enclosed in a casing that is mounted in gimbals and gyro-stabilized in order to maintain it horizontal in the earth's field.

The amplitude of each of the three voltages induced in the secondaries 11b, 12b and 13b will depend on their instant position relative to the direction of the field of the earth. These voltages will therefore vary with the instant heading of the aircraft, vessel or other carrier upon which the flux gate is mounted. As the compass is rotated in the field of the earth the three voltages will vary in a manner similar to the voltage variations caused by movement of the rotor in a conventional synchro system. The magnitude of the induced voltages in these secondaries, which are delta connected, is very small, being of the order of a few microvolts. Hence it is preferable to connect the output thereof to a Y-connected stator 15 of a torque amplifier shown as a coupling autosyn 16. The rotor element 17 of this autosyn is provided with a single-circuit winding and the voltage induced therein by the currents in its poly-circuit stator winding 15 is amplified in amplifier 18, of conventional construction, and transmitted to the variable phase winding 19 of the two-phase stator element of a low-inertia induction motor 20 having a squirrel-cage rotor 21. The other phase winding 19a of the motor stator is connected to 975 cycle A. C. output terminals on oscillator 14.

Rotors 17 and 21 are mechanically coupled together by a shaft 22. Hence the voltages impressed upon the stator windings 19 and 19a of motor 20 will cause its rotor 21 and rotor 17 to rotate until the latter reaches its null position. Induction motor 20 is therefore a torque amplifier which turns rotor 17 to the position it would take were it able itself to develop the necessary torque.

A change in the angular position of the flux gate 10 relative to the field of the earth effects a like angular change in the position of rotors 17 and 21 and the shaft 22 connected therebetween. The flux gate 10 is therefore analogous to the transmitter unit of synchro or self-synchronous system and the motors 16 and 20 are analogous to a repeater unit of such system.

For repeating the instant angular position of rotor 17, a second self-synchronous system is utilized and comprises a transmitter unit 23 and one or more repeater units 24. The transmitter and repeater units are similar in structure although the repeater would normally be smaller than the transmitter if the latter is to drive a number of repeater units.

The transmitter unit 23 includes a permanent magnet rotor 25 coupled to shaft 22 and a stator including a circular, laminated core. The stator has an exciting coil 27 wound upon it with a lead tapped off at each 120° point, thus making four leads altogether; two input leads 27a and two tapped leads 27b. The input leads 27a are connected to a source of alternating voltage indicated as 400 cycles. The constants of the transmitting unit (the number of turns, value of exciting curent, and magnetic alloy selected for the stator core) are chosen so that the stator core will be completely saturated twice during, and for most of, each cycle of its supply source. During periods of saturation, no inductive effect can be produced within the core by the permanent-magnet rotor 25. However, during each of the short unsaturated periods of the core, the rotor is free to produce an inductive effective upon it. During these unsaturated periods the magnetic flux of the rotor affects the core and voltages induced thereby are superimposed in the stator winding.

These voltages are at a frequency of 800 cycles since the stator core is rendered unsaturated for a short period twice during each cycle of the energizing current in winding 27. The voltages across the taps of each of the three parts of the stator winding differ in value and vary with the instant position of the rotor 25 relative to stator winding 27.

As previously stated, the repeater unit 24 is similar to transmitter unit 23 having a magnetic rotor 28 and a stator winding 29.

The stator windings 27 and 29 of the two units are connected in parallel by leads 27a and 27b and excited from the same 400 cycle A. C. source.

When the rotors of both units are in the same position relative to their respective stator windings, the three tapped voltages induced in the stator windings 27 and 29 will be alike. However, when the rotor 25 is rotated by shaft 22, the induced voltages in the stator winding 27 will differ from those in the stator winding 29 causing signal current to flow from winding 27 to winding 29 superimposed upon the excitation current. This flow of current produces a new resultant magnetic field flux in the stator winding 29, causing the rotor 28 of the repeater unit to rotate until it is in the same relative position to its stator winding 29 as the rotor 25 in the transmitter unit is to its stator winding 27. Accordingly, any angular displacement of rotor 25 by rotation of shaft 22 causes a like displacement of rotor 28.

As the bearing of the carrier for the flux gate 10 changes relative to the field of the earth, that bearing change will be fed electrically through the autosyn coupling 16 and induction motor 20, producing an equal angular change in the position of shaft 22 and of the rotor 25 of the transmitter unit 23, which angular change may be indicated by a pointer 30. Transmitter unit 23 is thus, in effect, a master compass. The position of pointer 30 is repeated by a pointer 31 on the rotor element 28 of each repeater unit 24.

The earth inductor compass and all other types of compass systems depending upon the magnetic flux of the earth for direct indications fail to indicate the true geographic north by the algebraic sum of the variation and deviation errors. Variation, which is the angle between the true or geographical and the magnetic meridian, is known for any given locality. The deviation is the total angle difference between the magnetic meridian and the indications of the compass system, and is caused by the magnetism of the vessel or other carrier upon which the compass system is carried.

In the earth inductor compass that has been described, the bearing indication on the transmitter unit 23 would, if not compensated, be in error by the algebraic sum of the variation and deviation errors. The variation error may be compensated by shifting the rotor 17 of the transmitter 23 relative to shaft 22.

This invention provides an automatically operating corrector or compensator which will substantially cancel out the deviation component of the total error.

One form of my improved deviation compensator comprises a flux-gate element 32 mounted so that it is rotatable in a space 33 wherein the magnetic flux is controlled both as to direction and strength by an arrangement of electromagnets 34a to 34g. The flux-gate element 32 is rotatable about a pivotal point 32e that is shown as displaced from the center of the element. Thus, the pivotal point is eccentrically placed with reference to the ends of said cores so that the air gap between the pole pieces of electromagnets 34a to 34g and the element 32 will differ in length according to the end of the flux-gate element that is presented to the magnet. The pivot point may, however, be located at the center of the element 32 if desired.

The flux-gate element is similar to any of the three legs of device 10. That is, the element includes two cores 32a and 32b of a material having a high permeability with a primary winding 32c split between them, the two halves of this winding being wound on their respective cores in opposite directions so as to be non-inductive with respect to a secondary winding 32d which surrounds the primary winding 32c.

Primary winding 32c is connected by brushes 35a and slip rings 35b to lines 35 to be fed from the same 487½ cycle output terminals on oscillator 14 as the primary of flux gate 10. A series resistor 36 is connected in one of the lines 35 to permit adjustment of the excitation current.

Like flux gate 10, the two cores 32a and 32b are saturated twice during, and for almost the entire period of, each cycle. However, during the two short periods in each cycle when cores 32a, 32b are unsaturated, the entry of the magnetic field from magnets 34a—34g into these cores effects a transformer action to induce a voltage into the secondary 32d. The frequency of the voltage output from the secondary 32d will be twice that of the primary, or 975 cycles since the cores 32a, 32b are saturated twice during each cycle.

The output voltage from the secondary 32d is connected by brushes 38a, slip rings 38b, resistor 38c and lines 38 to the input of the amplifier 18 in parallel to the rotor 17 or to a separate control grid.

The flux-gate element 32 is caused to rotate with the shaft 22 by mechanical connections indicated as gears 39 and shaft 40. The flux-gate element may, however, be caused to rotate by electrical connections from any part of the motion transmission system such as the autosyn coupling 16, 17 or 20 or from the magnesyn transmitter 23. In the latter arrangement the flux-gate element 32 would be carried on an electrical repeating device similar to the repeater 24.

As illustrated, the magnets 34a—34g are electromagnets consisting of low-remanence and retentivity cores 41a—41g enclosed in windings 42a—42g. The terminal connections of the windings 42a—42g are connected through adjustable resistors 43a—43g respectively, to conductors 44 which are energized from a direct-current source through lines 44a and a potentiometer 45. The cores of the magnets 34a to 34g may be fitted with pole pieces 46a—46g of various shapes as illustrated; electromagnet 34a having a plain cylindrical pole piece 46a, electromagnet 34b having a pole piece 46b extending over a considerable space and concaved toward the flux-gate element 32, pole piece 46c being much the same but convexed on the side presented to the flux gate element 32, electromagnet 34d having the end of its core 41d reduced in cross section to form a pole piece 46d having a geometrical shape that is of less area than the core. A magnetic-flux path 47 is fixed to electromagnet 34d to aid in controlling the flux emanating from its core 41d. The pole pieces illustrated are a few of the many that can be used to meet the requirements of a specific problem. Although only seven magnets are illustrated, more can be used if required. The magnets are to be arranged so that the flux exerts its influence on the space through which the flux-gate element is caused to rotate and so that they do not physically interfere with the rotation of this element.

In the embodiment shown in Fig. 1 the magnets 34a—34g are mounted on a base 50, which is adjustable by a knob 51 acting through a worm 52 and a worm gear 53 on the base 50. Each magnet may be mounted for individual adjustment both radially and peripherally. As shown, the magnets are mounted on individual supports 54a—54g, which are adjustable on a circular track 55 on the base 50 and are secured by setscrews 56a—56g. The supports 54a—54g carry plates 54a—57g, which are adjustable radially by setscrews 58a—58g extending through elongated radial slots 59a—59g in the plates 57a—57g. The plates 57a—57g carry the magnets 34a—34g. It is thus possible to adjust the magnets radially with relation to the center of rotation of the flux-gate element 32 to vary the length of the air gaps between the pole pieces of the magnets and the end of the flux-gate element as they pass each other due to rotation of the element.

The primary of the flux-gate element is excited by 487½ cycles per second alternating current from oscillator 14. Hence an E. M. F. of 975 cycles per second is impressed on the E. M. F. of similar frequency existing in the autosyn secondary (rotor) circuit 17. As both the E. M. F.'s are derived from the same source of excitation, they are locked in a fixed phase relationship. The effect of impressing the voltage from the flux-gate element 32 on the autosyn secondary (rotor) circuit 17 is to cause an E. M. F. to combine with the E. M. F. induced in this circuit by the autosyn primary (stator) 15 so that the secondary 17 can still be impressing a signal on the grid of the amplifier 18 even when located at a null point with reference to its own primary. The component of current flowing in the secondary winding 17 and derived from the flux-gate element 32 will furnish a signal to the amplifier, hence to the variable phase 19 of the induction motor 20, and cause the motor to drive shaft 22 and the autosyn secondary 17 to a position with reference to its own primary 15 such that the induced E. M. F. from the autosyn primary is opposite in phase and of equal magnitude to the E. M. F. introduced by the flux-gate element 32. When this condition exists the motion-transmission system will come to rest. The system can then be caused to move by a change in the value of the E. M. F.'s generated in the flux-gate 10.

As has been explained, the value of the E. M. F. in the autosyn secondary 17 will be determined by the E. M. F.'s induced in it by the autosyn primary 15 and the flux-gate element 32. The former is controlled by the angular relationship existing between the flux gate 10 and the field of the earth. The component of the total E. M. F. in secondary 17 due to flux-gate element 32 will be dependent as to magnitude and direction on the value of the excitation voltage in its primary and controllable, within limits, by resistor 36 and by the flux density within the saturable cores of the flux-gate element. The flux density will in turn be dependent upon the field intensity and direction, with reference to said cores, of the space within which the cores are at any time positioned. As the direction of the field and the field intensity will be controllable, by the number, disposition, strength and polarity of the magnets 34a—34g, which may be controlled by the adjustment of the resistors 45 and 43a—43g and by radial and peripheral adjustment of the magnets, the E. M. F. induced by flux-gate element 32 in the autosyn secondary 17 for any given position of the flux-gate element can be varied at will within wide limits. As the value and sign of this E. M. F. determines the amount and direction that the indicating devices 23 and 24 will be asynchronous with respect to the transmitting flux-gate 10 and the primary of the autosyn coupling 15, it is possible to introduce offsets between the transmitter and the indicator, which are of any selected value and sign for each heading of the transmitter and which may be used to introduce corrections into the system for any purpose desired.

The field of the earth will be present in the space 33 wherein the flux gate element 32 operates. Its value will, however, be so low compared with the field intensity due to the magnets that it will have negligible effect; also the excitation current in the primary of the flux-gate element 32 will be adjusted to such a low value that the effects of the field of the earth will be barely perceptible.

In the system described the magnet support is secured to the ship, aircraft or other carrier so as to move with said carrier and the flux-gate element 32 to be held in a constant direction in space in its plane of rotation by the transmitter controlled mechanism of the system. There is thus a relative motion between the magnets and the flux-gate element when the carrier changes direction or heading. It is not material to the successful operation of my invention which element is fixed in the carrier and which is fixed in the plane in space. In some adaptations of this invention it will be desirable for the flux-gate element to be fixed with reference to the carrier and for the magnet assembly and supports to be held in a position fixed with reference to space by the transmitter controlled mechanism.

Although a correction flux-gate system has been described above, in certain instances it may be desirable to produce the correction voltage by energizing the magnets 34a—34g from an alternating-current source of suitable frequency, in which case the rotor could comprise a magnetic core carrying a pick-up coil in which the correction voltage would be induced.

This invention can be applied to any system for synchronously transmitting angular motion, such, for example, as the direction transmitting system used in ordnance installations in order automatically to compensate for the parallax error that exists between a target-locating device, such as a telescope, and a remotely positioned instrument such as a range finder, searchlight or gun where it is desired that the instrument should always be brought to bear or converge on the target with the telescope.

It may be desirable to obtain a more sensitive control of the flux in the flux-gate element 32 due to each magnet. This can be effected as shown in Fig. 2 by providing a flux return path consisting of a bracket 60 of magnetic material, one end 61 of which is attached to the end of the cores 32a, 32b remote from the magnets 34a—34g and the other end 62 of which rotates in close proximity to the outer faces of the cores 41a—41g. Suitable adjustments can be provided to control the effect of each magnet as above described.

The invention is shown in Fig. 3 as applied to a system for producing a polyphase correction voltage wihch may be introduced into a suitable portion of the system carrying polyphase current, for example, between the earth-inductor-compass flux-gate element 10 and the torque-amplifier motor 16 or between the magnesyn transmitter 23 and repeater 24.

In the embodiment shown in Fig. 3, the elements corresponding to those in Fig. 1 are given the same reference characters and will not be redescribed. In this embodiment the single flux-gate element 32 is replaced by a delta-connected flux-gate element 80, which is constructed and arranged in a manner similar to the flux-gate element 10 above described, and includes three legs 81, 82 and 83 having a primary energizing winding 84, which is connected by brushes 85a and slip rings 85b to leads 85 to be supplied from the 487½ cycle output of the oscillator 14. A series resistance 86 is connected to control the energizing current in the primary 84. The secondary windings 87 of the three legs of the flux-gate assembly 80 are connected in delta by brushes 88 and slip rings 89 to leads 90, which are in turn connected through series resistances 91 and switch 92 to corresponding points in the secondaries 11b, 12b and 13b of flux gate 10 and are also connected by a switch 92 to the tapped leads 27b of the magnesyn transmitter 23 and to a mid-point 94 of a resistance 95 which is connected across the supply leads 27a of the magnesyn transmitter 23. In this embodiment the leads 27a are connected to the 487½ cycle output of the oscillator 14 so that the double-frequency current of 975 cycles in the magnesyn winding 27 corresponds in frequency to the correction current supplied from the secondaries 87.

The flux-gate assembly 80 is mounted for rotation in a manner similar to the flux-gate element 32 of Fig. 1 in the field of magnets 34a to 34g as above described, and that these magnets can be adjusted to control the field intensity at the various angular positions of the flux-gate assembly 80.

The operation of the embodiment shown in Fig. 3 is similar to that above described. In this embodiment, however, the three-phase correction voltages supplied by the line 90 apply the correction, depending upon the position of the switch 92, either between the flux gate 10 and the torque amplifier 16 so as to cause the torque amplifier to take a corrected position, or to the connections between the magnesyn transmitter 23 and the remote repeaters 24 so as to offset the repeaters with respect to the transmitter. In the latter instances, however, the correction will not appear at the pointer 30 of the transmitter 23.

The value and distribution of the correction voltages can be controlled by variation and adjustment of the position of the magnets 34a to 34g; also by control of the excitation of the flux-gate primary by adjustment of the resistor 86 and by suitable variation of the resistors 91 in the output circuits of the flux gate 80. The resistor 94 is adjusted to apply the potential at the mid-point of the line 27a and can be varied to obtain the correct voltage distribution.

Although the magnets 34a to 34g have been shown as electromagnets, permanent magnets can be substituted therefor, in which event suitable control of the flux distribution is obtained by varying the position and dimensions of the permanent magnet or by selection of the magnetic material.

In all of these embodiments a correction voltage is applied that is a predetermined function of the angular position of the transmitting element and the correction curve can be adjusted to take the desired irregular or non-symmetrical form.

Although certain specific embodiments of the invention have been shown herein for purposes of illustration, changes and adaptations can be made therein as will be readily understood by a person skilled in the art.

The invention described herein may be manufactured and used by or for the Government of the United States of America for governmental purposes without the payment of any royalties thereon or therefor.

What is claimed is:

1. A system for transmitting angular motion comprising an electrical data transmitter, a repeater unit electrically connected to said data transmitter including a rotatable element actuatable to take an angular position which is a function of the transmitted data, a correction voltage generator comprising a field member and an armature member, means for driving one of said members with said rotatable element, said armature when in any selected angular position with respect to said field having means to generate a voltage which is a function of the field strength at said position, means superimposing said voltage on the data transmitted to said repeater to modify the position of said element, and individual means for adjusting said field strength at selected angular positions to conform to a predetermined pattern suited to introduce desired corrections into the system.

2. A system for transmitting angular motion comprising an electrical data transmitter, a repeater unit electrically connected to said data transmitter including a rotatable element actuatable to take an angular position which is a function of the transmitted data, a correction voltage generator comprising a field member and an armature member, means driving one of said members with said rotatable element, said armature comprising a flux gate having a saturable core, primary exciting winding and secondary winding connected to have a voltage induced therein which is a function of the field strength, means superimposing said voltage on the data transmitted to said repeater to modify the position of said element, and individual means for adjusting said field strength at selected angular positions to conform to a predetermined pattern suited to introduce desired corrections into the system.

3. A system for transmitting angular motion comprising an electrical data transmitter, a repeater unit electrically connected to said data transmitter including a rotatable element actuatable to take an angular position which is a function of the transmitted data, a correction voltage generator comprising a field member and an armature member, means driving one of said members with said rotatable element, said armature when in any selected angular position with respect to said field having means to generate a voltage which is a function of the field strength at said position, means superimposing said voltage on the data transmitted to said repeater to modify the position of said element, said field member comprising a plurality of magnetic elements disposed about the path of rotation of said armature to produce a field having a predetermined pattern suited to introduce desired corrections into the system.

4. A system for transmitting angular motion comprising an electrical data transmitter, a repeater unit electrically connected to said data transmitter including a rotatable element actuatable to take an angular position which is a function of the transmitted data, a correction voltage generator comprising a field member and an armature member, means driving one of said members with said rotatable element, said armature when in any selected angular position with respect to said field having means to generate a voltage which is a function of the field strength at said position, means superimposing said voltage on the data transmitted to said repeater to modify the position of said element, said field member comprising a plurality of magnetic elements disposed about the path of rotation of said armature and individual means for adjusting the position of each magnetic element with respect to said armature path to produce a field having a predetermined pattern suited to introduce desired corrections into the system.

5. A system for transmitting angular motion comprising an electrical data transmitter, a repeater unit electrically connected to said data transmitter including a rotatable element actuatable to take an angular position which is a function of the transmitted data, a correction voltage generator comprising a field member and an armature member, means driving one of said members with said rotatable element, said armature when in any selected angular position with respect to said field having means to generate a voltage which is a function of the field strength at said position, means superimposing said voltage on the data transmitted to said repeater to modify the position of said element, said field member comprising a plurality of magnetic elements having pole pieces disposed about the path of rotation of said armature, and individual means for adjusting the position of each pole piece with respect to said armature path to produce a field having a predetermined pattern suited to introduce desired connections into the system.

6. A system for transmitting angular motion comprising an electrical data transmitter, a repeater unit electrically connected to said data transmitter including a rotatable element actuatable to take an angular position which is a function of the transmitted data, a correction voltage generator comprising a field member and an armature member, means driving one of said members with said rotatable element, said armature when in any selected angular position with respect to said field having means to generate a voltage which is a function of the field strength at said position, means superimposing said voltage on the data transmitted to said repeater to modify the position of said element, said field member comprising a plurality of electromagnets disposed about the path of rotation of said armature, and individual means adjusting the excitation and the position of each electromagnet with respect to said armature path to produce a field having a predetermined pattern suited to introduce desired corrections into the system.

7. A system for transmitting angular motion comprising an electrical data transmitter, a repeater unit electrically connected to said data transmitter including a rotatable element actuatable to take an angular position which is a function of the transmitted data, a correction voltage generator comprising a field member and an armature member, means driving one of said members with said rotatable element, said armature comprising a flux gate having a saturable core, primary exciting winding, and secondary winding connected to have a voltage induced therein which is a function of the field strength, means superimposing said voltage on the data transmitted to said repeater to modify the position of said element, said field member comprising a plurality of magnetic elements disposed about the path of rotation of said armature to produce a field having a predetermined pattern suited to introduce desired corrections into the system.

8. A system for transmitting angular motion comprising an electrical data transmitter, a repeater unit electrically connected to said data transmitter including a rotatable element actuatable to take an angular position which is a function of the transmitted data, a correction voltage generator comprising a field member and an armature member, means driving one of said members with said rotatable element, said armature comprising a flux gate having a saturable core, primary exciting winding, and secondary winding connected to have a voltage induced therein which is a function of the field strength, means superimposing said voltage on the data transmitted to said repeater to modify the position of said element, said field member comprising a plurality of magnetic elements disposed about the path of rotation of said armature and individual means for adjusting the position of each magnetic element with respect to said armature path to produce a field having a predetermined pattern suited to introduce desired connections into the system.

9. A system for transmitting angular motion comprising an electrical data transmitter, a repeater unit electrically connected to said data transmitter including a rotatable element actuatable to take an angular position which is a function of the transmitted data, a correction voltage generator comprising a field member and an armature member, means driving one of said members with said rotatable element, said armature comprising a flux gate having a saturable core, primary exciting winding, and secondary winding connected to have a voltage induced therein which is a function of the field strength, means superimposing said voltage on the data transmitted to said repeater to modify the position of said element, said field member comprising a plurality of electromagnets disposed about the path of rotation of said armature, and individual means adjusting the excitation and the position of each electromagnet with respect to said armature path to produce a field having a predetermined pattern suited to introduce desired connections into the system.

10. A system for transmitting angular motion comprising an electrical transmitter, a torque amplifier comprising a polycircuit primary winding electrically connected to receive data from said transmitter, a rotatable secondary winding, amplifier means connected to receive energy from said secondary winding and to amplify the same, a reversible motor driven by the output of said amplifier and connected to drive said secondary winding to a null position, a correction voltage generator comprising a field member including a plurality of individually adjustable means for providing an adjustable magnetic field and an armature member, means driving one of said members by said motor, said armature member when in any selected angular position with respect to said field member being adapted to generate a voltage which is a function of the field strength at said position, and means superimposing said voltage on the motor to modify the position thereof.

11. A system for transmitting angular motion comprising an electrical transmitter, a torque amplifier comprising a polycircuit primary winding electrically connected to receive data from said transmitter, a rotatable secondary winding, amplifier means connected to receive energy from said secondary winding and to amplify the same, a reversible motor driven by the output of said amplifier and connected to drive said secondary winding to a null position, a correction voltage generator comprising a field member and an armature member, means driving one of said members by said motor, said armature when in any selected angular position with respect to said field having means to generate a voltage which is a function of the field strength at said position, means superimposing said voltage on the motor to modify the position thereof, and individual means for adjusting said field strength at selected angular positions to conform to a predetermined pattern suited to introduce desired corrections into the system.

12. A system for transmitting angular motion comprising an electrical transmitter, a torque amplifier comprising a polycircuit primary winding electrically connected to receive data from said transmitter, a rotatable secondary winding, amplifier means connected to receive energy from said secondary winding and to amplify the same, a reversible motor driven by the output of said amplifier and connected to drive said secondary winding to a null position, a correction voltage generator comprising a field member and an armature member, means driving one of said members by said motor, said armature comprising a flux gate having a saturable core, primary exciting winding and secondary winding connected to have a voltage induced therein which is a function of the field strength, and means superimposing said voltage on said motor to modify the position thereof.

13. A system for transmitting angular motion comprising an electrical transmitter, a torque amplifier comprising a polycircuit primary winding electrically connected to receive data from said transmitter, a rotatable secondary winding, amplifier means connected to receive energy from said secondary winding and to amplify the same, a reversible motor driven by the output of said amplifier and connected to drive said secondary winding to a null position, a correction voltage generator comprising a field member and an armature member, means driving one of said members by said motor, said armature comprising a flux gate having a saturable core, primary exciting winding and secondary winding connected to have a voltage induced therein which is a function of the field strength, means superimposing said voltage on said motor to modify the position thereof, and individual means for adjusting said field strength at selected angular positions to conform to a predetermined pattern suited to introduce desired corrections into the system.

14. A system for transmitting angular motion comprising an electrical transmitter, a torque amplifier comprising a polycircuit primary winding electrically connected to receive data from said transmitter, a rotatable secondary winding, amplifier means connected to receive energy from said secondary winding and to amplify the same, a reversible motor driven by the output of said amplifier and connected to drive said secondary winding to a null position, a correction voltage generator comprising a field member and an armature member, means driving one of said members by said motor, said armature comprising a flux gate having a saturable core, primary exciting winding and secondary winding connected to have a voltage induced therein which is a function of the field strength, means superimposing said voltage on said motor to modify the position thereof, said field member comprising a plurality of magnetic elements disposed about the path of rotation of said armature and individual means for adjusting the position of each magnetic element with respect to said armature path to produce a field having a predetermined pattern suited to introduce desired corrections into the system.

15. A system for transmission of angular motion comprising a motion transmitter unit having relatively movable armature and field elements, one or more repeater units having similar elements, electrical connections between the field elements of said units, means for energizing the field elements of said units whereby motion of said transmitter unit would normally produce a like motion of said repeater unit, a correction voltage generator comprising a field member and an armature member, means driving one of said members with said transmitter unit, said armature having means when in any angular position in said field to develop a voltage which is a function of the field strength in that position, means modifying the position of said repeater unit in accordance with said voltage so as to introduce a desired correction.

16. A system for transmitting angular motion comprising an electrical data transmitter, a torque amplifier comprising a polycircuit field winding electrically connected to receive data from said transmitter, a rotor having a winding, a reversible motor electrically connected to be driven by the current in said rotor winding and mechanically connected to drive said rotor winding to a null position in said field, and saturable-core-induction means to modify the voltage produced by said data transmitter as an arbitrary non-symmetrical function of said data.

17. A system for transmitting angular motion comprising an electrical data transmitter, a torque amplifier comprising a polycircuit field winding electrically connected to receive data from said transmitter, a rotor having a winding, amplifier means having an input circuit connected to receive energy from said rotor winding and an output circuit, a reversible motor electrically connected to be driven by energy in said output circuit, and mechanically connected to drive said rotor winding to a null position in said field, and saturable-core-induction means for generating a correction voltage to modify the voltage produced by said data transmitter as an arbitrary non-symmetrical function of said data.

18. A system for transmitting angular motion comprising an electrical data transmitter, a repeater unit electrically connected to said transmitter including a rotatable element actuatable to take an angular position that is a function of the transmitted data, a correction voltage generator comprising a field member and an armature member, means for driving one of said members with said rotatable element, said armature having means to generate a voltage that is a function of the field strength at said position, means superimposing said voltage on the data transmitted to said repeater to modify the position of said element, and individual means for adjusting said field strength at selected angular positions to conform to a predetermined pattern suited to introduce desired corrections into the system.

19. A system for transmitting angular motion comprising an electrical data transmitter, a repeater unit connected to said transmitter including a rotatable element actuatable to take an angular position which is a function of the transmitted data, a correction voltage generator comprising a field member and an armature member, means for driving one of said members with said rotatable element, said armature having means to generate a voltage that is a function of the field strength at said position, means superimposing sad voltage on the data transmitted to said repeater to modify the position of said element, and individual means for adjusting said field strength at selected angular positions to conform to a predetermined pattern suited to introduce desired corrections into the system.

20. A system for transmitting angular motion comprising an electrical transmitter, a torque amplifier comprising a polycircuit primary winding electrically connected to receive data from said transmitter, a rotatable secondary winding, amplifier means connected to receive energy from said secondary winding and to amplify the same, a reversible motor driven by the output of said amplifier and connected to drive said secondary winding to a null position, a correction voltage generator comprising a field member having individually adjustable means for providing an adjustable magnetic field and an armature member, means driving one of said members by said motor, said armature member when in any selected angular position with respect to said field member being adapted to generate a voltage that is a function of the field strength at said position, means superimposing said voltage on the motor to modify the position thereof, and means for adjusting said field strength at selected angular positions to conform to a predetermined pattern suited to introduce desired corrections into the system.

21. A system for transmitting angular motion comprising an electrical transmitter, a torque amplifier comprising a polycircuit primary winding connected to receive data from said transmitter, a rotatable secondary winding, amplifier means connected to receive energy from said secondary winding and to amplify the same, a reversible motor driven by the output of said amplifier and connected to drive said secondary winding to a null position, a correction voltage generator comprising a field member having a plurality of individually adjustable means for providing a magnetic field and an armature member, means driving one of said members by said motor, said armature member being adapted to generate a voltage that is a function of the field strength at a selected angular position, means superimposing said voltage on the motor to modify the position thereof, and means for adjusting said field strength.

THOMAS O. McCARTHY.

REFERENCES CITED

The following references are of record in the file of this patent:

UNITED STATES PATENTS

| Number | Name | Date |
|---|---|---|
| 1,172,979 | Girardelli | Feb. 22, 1916 |
| 2,308,566 | Noxon | Jan. 19, 1943 |
| 2,361,433 | Stuart | Oct. 31, 1944 |
| 2,361,790 | Noxon | Oct. 31, 1944 |
| 2,412,356 | Roberts et al. | Dec. 10, 1946 |